United States Patent [19]
Freund

[11] Patent Number: 5,887,208
[45] Date of Patent: Mar. 23, 1999

[54] FILM TRANSPORT AND RELEASE DEVICE FOR A PHOTOGRAPHIC CAMERA

[75] Inventor: Michael N. Freund, Hintere Haupstrasse 4, Germany

[73] Assignee: Eastman Kodak Company, Rochester, N.Y.

[21] Appl. No.: 906,792

[22] Filed: Aug. 5, 1997

[30] Foreign Application Priority Data

Sep. 7, 1996 [DE] Germany .................. 196 36 449.3

[51] Int. Cl.$^6$ ................................... G03B 1/00
[52] U.S. Cl. .................. 396/395; 396/401; 396/411; 396/416
[58] Field of Search ................... 396/395, 397, 396/399, 400, 401, 477, 415, 416

[56] References Cited

U.S. PATENT DOCUMENTS

| | | | |
|---|---|---|---|
| 1,690,292 | 11/1928 | Grosso | 396/411 |
| 2,241,122 | 5/1941 | Drotning | 396/395 |
| 2,252,449 | 8/1941 | Wagner | 396/401 |
| 4,213,687 | 7/1980 | Hattis et al. | 396/400 |

FOREIGN PATENT DOCUMENTS 26 21 437 B2  5/1979  Germany .

*Primary Examiner*—Eddie C. Lee
*Attorney, Agent, or Firm*—Robert Luke Walker

[57] ABSTRACT

The invention relates to a film transport and release device for a photographic camera comprising a body part that pulls out and slides in parallel to the film transport direction in relation to the camera body, where in the pulled-out position of the body part the camera is ready to take a picture. Furthermore, a film transport wheel for a perforated film strip is provided. The body part has a toothed rack which is assigned a toothed wheel mounted permanently on a driving arbor arranged in axially movable and non-rotatable manner in the film transport wheel. Here the toothed wheel is movable by means of the release into its ready-to-mesh position in relation to the toothed rack and is kept in this position after operation of the release until the film strip has been transported one picture field further.

16 Claims, 2 Drawing Sheets

FILM TRANSPORT AND RELEASE DEVICE FOR A PHOTOGRAPHIC CAMERA

FIELD OF THE INVENTION

The invention relates to a film transport and release device for a photographic camera comprising a body part that pulls out and slides in parallel to the film transport direction in relation to the camera body, where in the pulled-out position of the body part the camera is ready to take a picture, and a film transport wheel for a perforated film strip.

BACKGROUND OF THE INVENTION

A film transport and shutter operating device is known from the German patent 26 21 437; this is operated by means of a handle movable back and forth in the film transport direction. For film transport purposes, however, an expensively designed transmission is required that comprises a retaining pawl-controlled slider and several toothed wheels and levers.

When manufacturing cameras of very simple design, so-called single-use cameras, transmissions of that complexity cannot be used for cost reasons.

SUMMARY OF THE INVENTION

The object underlying the present invention is therefore to provide for a photographic camera of the generic type a film transport and release device that comprises a few simple parts and nevertheless functions dependably.

This is achieved in accordance with the invention in that the body part has a toothed rack which is assigned a toothed wheel mounted permanently on a driving arbor arranged in axially movable and non-rotatable manner in the film transport wheel, and in that the toothed wheel is movable by means of the release into its ready-to-mesh position in relation to the toothed rack and is kept in this position after operation of the release until the film strip has been transported one picture field further.

Here the toothed wheel is, when the camera is ready to take a picture, outside the meshing area with the toothed rack and is kept in this position by spring force.

The toothed wheel does not return to a position outside the meshing area with the toothed rack until the body part has been completely pushed in, and hence until the film strip has been transported one picture field further.

In detail, the new device is designed such that the driving arbor is multi-edged in cross-section, preferably square, and has a collar behind which a spring-loaded and movably guided locking element engages when the toothed wheel meshes with the toothed rack.

This device in accordance with the invention is of extremely simple design and is suitable by virtue of its low manufacture and assembly costs preferably for use in cameras of very simple design.

BRIEF DESCRIPTION OF THE FIGURES

The further features and advantages are stated in the description of a design example of the invention illustrated in the drawing and in the further sub-claims. The drawing shows in FIG. 1 a section through a camera in accordance with the invention in a plan view, FIG. 2 the film transport and release device incorporated in the camera as per FIG. 1 in the ready-to-release position in a partial view, FIG. 3 the device as per FIG. 2 in the film transport position, and, FIG. 4 the device as per FIG. 2 after completing film transport.

DETAILED DESCRIPTION OF THE INVENTION

Figure 1:
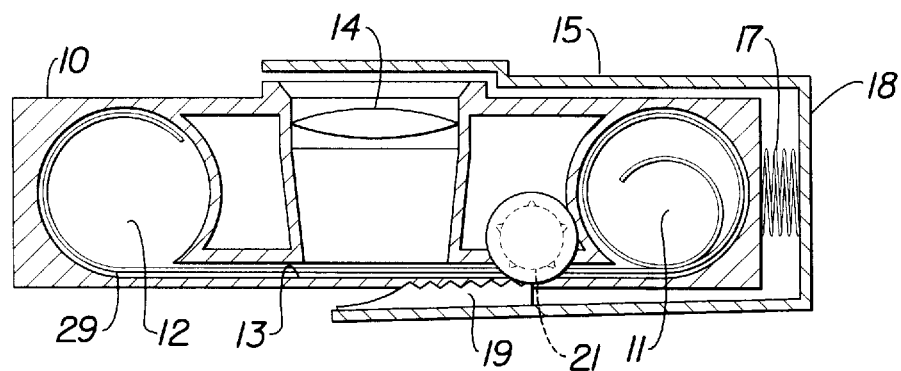
Figure 2:
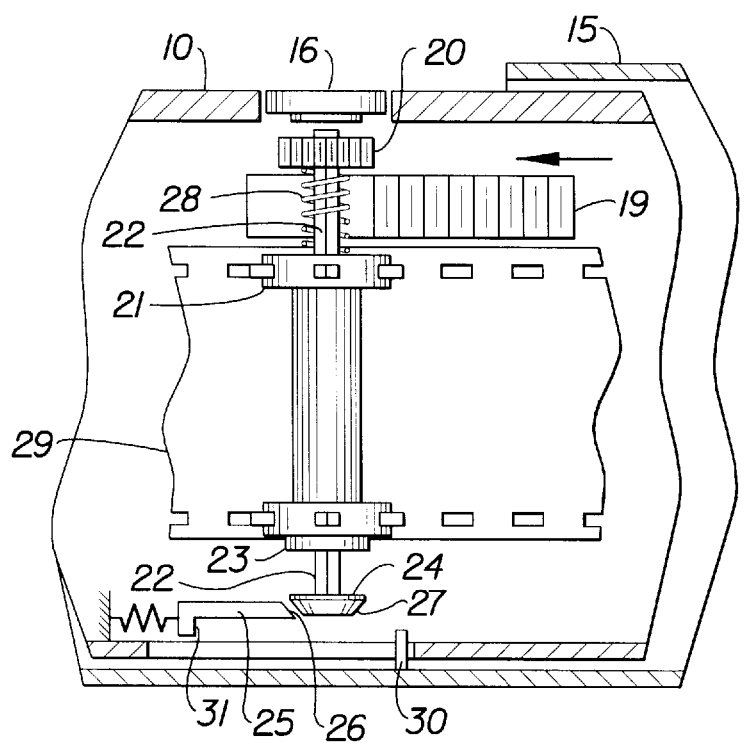
Figure 3:
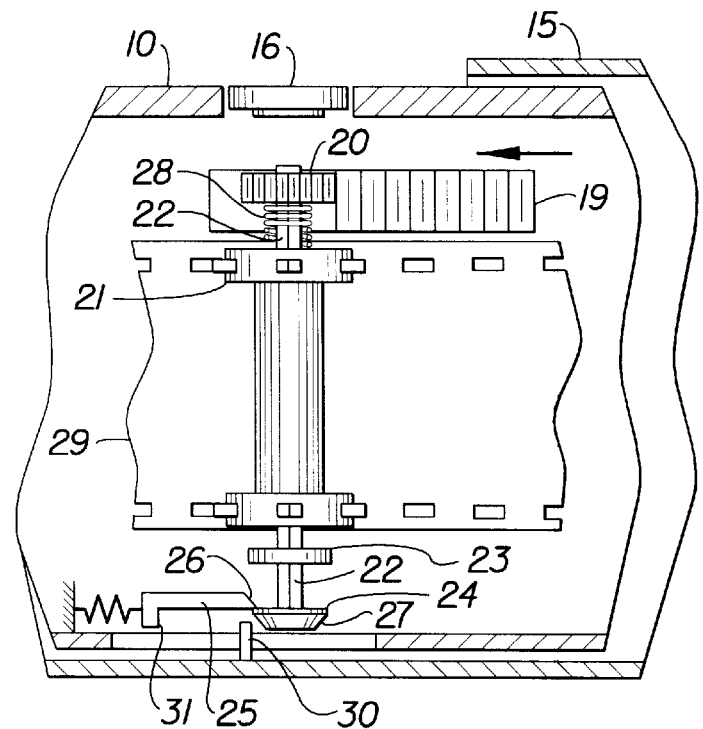
Figure 4:
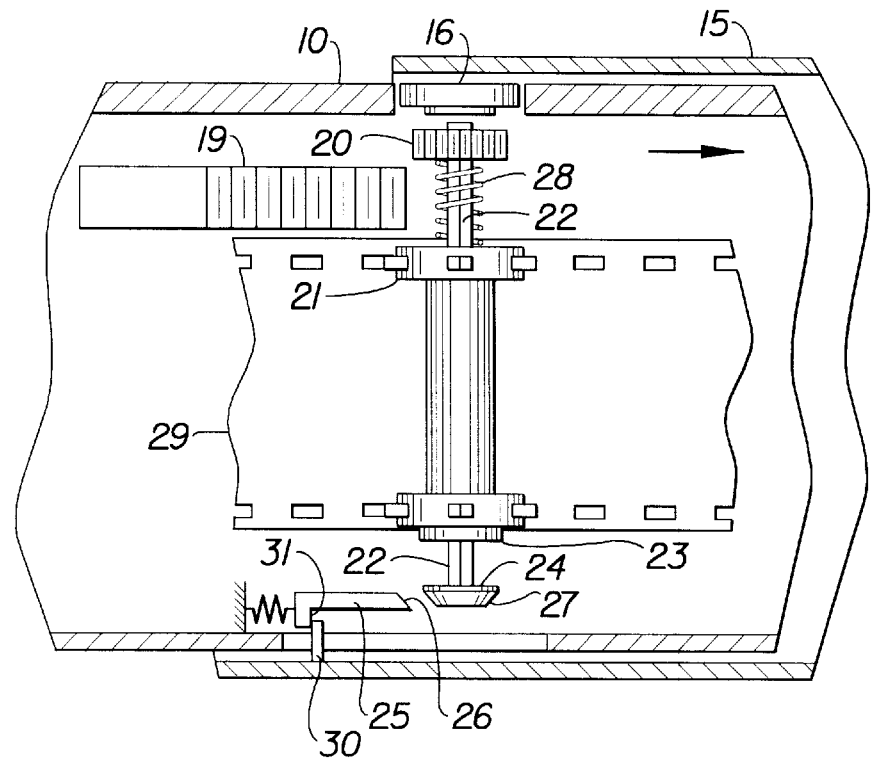

As shown in the drawing, the camera comprises a body 10 with a film supply chamber 11 and a film receiving chamber 12, connected to one another by a film channel 13. A lens 14 and a look-through viewfinder (not shown) are usually also arranged inside the body 10.

A cap-like body part 15 is movably guided in the film transport direction over the body 10, being movable back and forth from a pushed-in rest position into a pulled-out operating position. In the pushed-in rest position, the body part 15 covers both the lens 14 and a manually operable release 16. In its pulled-out operating position, the body part 15 is held by a compression spring 17 that connects on the one side to the body 10 and on the other side to a wall 18 of the body part 15. Finally, a toothed rack 19 is provided on the body part 15 and cooperates with a toothed wheel 20.

This toothed wheel 20 is mounted on a driving arbor 22 mounted in axially movable but non-rotatable manner in a film transport wheel 21. In the design example, this arbor is designed with square cross-section. It can however also be designed as a round arbor provided with one or more faces. The axial passage opening of the film transport wheel 21 has a shape adapted to the cross-section of the driving arbor 22. At that end of the driving arbor 22 opposite the toothed wheel 20, firstly a collar 23 and secondly a truncated-cone locking flange 24 are provided.

In the movement area of the locking flange 24, a spring-loaded locking element 25 is movably mounted in the body 10. The locking element 25 has an inclined face 26 opposite the tapered face 27 of the locking flange 24 in the initial position of the toothed wheel/driving arbor/locking flange unit. This initial position is achieved by a compression spring 28 arranged between the toothed wheel 20 and the film transport wheel 21 and pulling the collar 23 against the locking flange-side end face of the film transport wheel 21.

For the purposes of a taking a photographic picture on a film strip 29, the body part 15 is slid out of the rest position shown in FIG. 1 into the pulled-out operating position. This frees the release 16 and the lens 14. The toothed rack 19 is now in front of the toothed wheel 20 with its first tooth. When the release 16 is pressed down, the toothed wheel is moved into the movement area of the toothed rack 19 as the compression spring 28 is compressed. At the same time, the locking element 25 slides with its inclined face 26 up along the tapered face 27 of the locking flange 24 until it engages behind the latter and hence holds the toothed wheel/driving arbor unit in this position.

After taking a photographic picture, the body part 15 is pressed back into its pushed-in rest position, with the toothed wheel 20 being in rolling contact with the toothed rack, turning the film transport wheel 21 via the driving arbor 22 and transporting the film strip 29 one picture field further. The complete transport of a picture field is however only achieved when the body has been pushed in to its rest position.

If the body part 15 is pulled out again before a complete picture field has been transported, the film strip 29 is only moved back and forth according to the movement of the body part 15.

The toothed wheel 20 does not leave the toothed rack 19 until the rest position of the body part 15 has been reached, and a stop 30 mounted on the body part 15 comes up against a shoulder 31 provided on the locking element 25, thereby achieving the release of the locking flange 24 from the locking element 25. Because of the compression spring 28, the toothed wheel/driving arbor/locking flange unit snaps back into its initial position and the toothed wheel 20 again moves outside the movement area of the toothed rack 19.

If the body part 15 is moved back and forth in this state, the film transport wheel is not rotated and hence the film strip 29 is not transported.

What is claimed is:

1. Film transport and release device for a photographic camera, said camera having a body and using a perforated filmstrip, said device comprising:

a body part that pulls out and slides in parallel to a film transport direction in relation to the camera body, to a pulled-out position of said body part wherein said camera is ready to take a picture;

a toothed rack attached to said body part, said toothed rack defining a movement area;

a film transport wheel for the perforated film strip;

a driving arbor arranged in an axially movable and non-rotatable manner within said film transport wheel, and rotatable together with said film transport wheel;

a release operable to axially move said driving arbor;

a toothed wheel assigned to said toothed rack, said toothed wheel being mounted permanently on said driving arbor, said toothed wheel being movable by said operation of said release into said movement area for engagement with said toothed rack; and means for keeping said toothed wheel in said movement area after said operation of said release until said film strip has been transported one picture field further.

2. Film transport and release device according to claim 1, wherein said toothed wheel is in a non-meshing position relative to said toothed rack, when said body part is in said pulled out position and said camera is ready to take a picture, and wherein said toothed wheel is kept in said non-meshing position by spring force.

3. Film transport and release device according to claim 1, wherein said body part is capable of sliding in parallel to a film transport direction in relation to the camera body to transport said film strip one picture field further.

4. Film transport and release device according to claim 3, wherein said body part is capable of sliding in parallel to a film transport direction in relation to the camera body to a completely pushed in position wherein said toothed wheel is in a non-meshing position relative to said toothed rack.

5. Film transport and release device according to claim 1, wherein said body part is movable in parallel to said film transport direction to mesh said toothed wheel and said toothed rack when said toothed wheel is in said ready-to-mesh position, and wherein said driving arbor has a locking flange and said means for keeping further comprises a spring-loaded and movably guided locking element mounted in said body, said locking element engaging said locking flange when said toothed wheel is meshing with said toothed rack.

6. Film transport and release device according to claim 5, wherein said locking flange is arranged on an end of said driving arbor opposite said toothed wheel and said end of said driving arbor projects from said film transport wheel.

7. Film transport and release device according to claim 5, wherein said locking flange and said locking element each have inclined faces facing one another and parallel to one another.

8. Film transport and release device according to claim 5, characterized in that said driving arbor is designed multi-edged in cross-section, preferably square.

9. Film transport and release device according to claim 5, characterized in that said locking flange is arranged on an end of said driving arbor opposite said toothed wheel and said end projects from said film transport wheel.

10. Film transport and release device according to claim 5, characterized in that both at said locking flange and said locking element inclined faces facing one another and parallel to one another are provided.

11. Film transport and release device according to claim 1, wherein said driving arbor is multi-edged in cross-section.

12. Film transport and release device according to one of claim 1, wherein said body part has a stop that engages with said locking element when said body part is pushed in.

13. Film transport and release device according to one of claim 1, characterized in that a stop is provided on said body part that engages with said locking element when said body part is pushed in.

14. Film transport and release device for a photographic camera comprising a body part that pulls out from a pushed in position and slides in parallel to the film transport direction in relation to the camera body to a pulled out position, where in the pulled-out position of said body part said camera is ready to take a picture, and a film transport wheel for a perforated film strip, characterized in that said body part has a toothed rack which cooperates with a toothed wheel mounted permanently on a driving arbor arranged in axially movable and non-rotatable manner in said film transport wheel and rotatable together with said film transport wheel, and in that said toothed wheel is movable by means of said release into a position in which said toothed wheel is ready for engagement with said toothed rack and is kept in said position after operation of said release until said body part has moved from said pulled out position into said pushed in position, whereby said film strip has been transported one picture field further.

15. Film transport and release device according to claim 14, characterized in that said toothed wheel is, when said camera is ready to take a picture, outside a meshing area with said toothed rack and is kept in this position by spring force.

16. Film transport and release device according to claim 14, characterized in that after transport of said film strip by one picture field further when said body part is completely pushed in, said toothed wheel moves to a position outside a meshing area of said toothed rack.

* * * * *